United States Patent [19]

Tsuda

[11] Patent Number: 5,411,069
[45] Date of Patent: May 2, 1995

[54] PNEUMATIC RADIAL TIRES INCLUDING AN ANNULAR RECESS PORTION IN THE TREAD

[75] Inventor: Toru Tsuda, Tokyo, Japan

[73] Assignee: Bridgestone Corporation, Tokyo, Japan

[21] Appl. No.: 212,925

[22] Filed: Mar. 15, 1994

[30] Foreign Application Priority Data

Mar. 15, 1993 [JP] Japan .................................. 5-054302

[51] Int. Cl.⁶ ......................... B60C 3/00; B60C 9/20; B60C 101/00
[52] U.S. Cl. .................................. 152/209 R; 152/454; 152/531; 152/533; 152/538; 156/110.1; 156/117
[58] Field of Search .................... 152/209 R, 454, 526, 152/531, 533, 538, 548; 156/117, 110.1

[56] References Cited

U.S. PATENT DOCUMENTS

| | | | |
|---|---|---|---|
| 1,363,300 | 12/1920 | Yohn | 152/209 R |
| 4,824,501 | 4/1989 | Ushikubo et al. | |
| 5,032,198 | 7/1991 | Kojima et al. | 152/531 X |

FOREIGN PATENT DOCUMENTS

| | | | |
|---|---|---|---|
| 0465786 | 1/1992 | European Pat. Off. | |
| 0502695 | 9/1992 | European Pat. Off. | |
| 500830 | 3/1920 | France | |
| 4-243601 | 8/1992 | Japan | 152/209 R |
| 4-243602 | 8/1992 | Japan | 152/209 R |
| 4-243603 | 8/1992 | Japan | 152/209 R |
| 1310498 | 3/1973 | United Kingdom | 152/209 R |

*Primary Examiner*—Adrienne Johnstone
*Attorney, Agent, or Firm*—Sughrue, Mion, Zinn, Macpeak & Seas

[57] ABSTRACT

A pneumatic radial tire has a double crown structure that an annular recess portion is arranged in a tread at a given region in a widthwise direction thereof, in which the tread is divided into a central region, a pair of middle regions and a pair of side regions and at least one auxiliary reinforcing cord layer is arranged on a belt so as to substantially envelop a crown portion of a carcass and a full radially outer surface of the belt, provided that a stretching ratio of the cords in the auxiliary reinforcing cord layer in the central region and side regions is equal to or more than that in the middle regions, whereby high-speed durability is improved together with excellent drainage while controlling the increase of tire weight and cost as much as possible.

7 Claims, 1 Drawing Sheet

PNEUMATIC RADIAL TIRES INCLUDING AN ANNULAR RECESS PORTION IN THE TREAD

BACKGROUND OF THE INVENTION

1. Field of the Invention

This invention relates to a pneumatic radial tire having an improved high-speed durability while controlling increases of tire weight and cost as much as possible and comprising a tread in which an annular recess portion is arranged in the tread at a given region in the widthwise direction thereof.

2. Description of the Related Art

In general, it is known that a pneumatic radial tire having an annular recess portion in the widthwise center of the tread is particularly excellent in drainage during running at high speeds. Since the drainage increases as the volume of the annular recess portion becomes large, the depth of the annular recess portion in the tire is desired to become deep, but it is restricted by the thickness of the tread. For this end, it is advantageous to make deeper the depth of the annular recess portion by depressing regions of the carcass and the belt at the annular recess portion in the tread inward in the radial direction of the tire and along the circumference of the tread. There are also known pneumatic radial tires satisfying such a requirement.

In the above conventional radial tires, the ends and central portion of the belt are apt to expand in the radial direction of the tire through centrifugal force during running at high speeds, and hence there is caused a fear of generating belt separation by the interaction between the above radial expansion and deformation produced by running under loading to degrade high-speed durability. Therefore, a cap layer covering the full radially outer surface of the belt, a narrow-width layer covering only the end portion of the belt, an auxiliary belt layer covering only the central portion of the belt or the like should be arranged as a belt reinforcing member, which increases the tire weight only by the amount of the belt reinforcing member used as compared with tires having an ordinary belt structure to degrade rolling resistance and fuel consumption. Thus, the conventional radial tires are required to improve high-speed durability without increase of tire weight and cost.

SUMMARY OF THE INVENTION

It is, therefore, an object of the invention to give an excellent high-speed durability to a pneumatic radial tire comprising a tread in which an annular recess portion is arranged in the tread at a given region in the widthwise direction thereof for developing excellent drainage while controlling the increase of tire weight and cost as much as possible.

According to the invention, there is the provision of a pneumatic radial tire comprising a carcass comprised of at least one rubberized cord ply, a belt superimposed on the carcass and comprised of rubberized cord layers, the cords of which layers being crossed with each other, at least one auxiliary reinforcing cord layer substantially enveloping a crown portion of the carcass and a full radially outer surface of the belt, and a tread having an annular recess portion arranged in the tread at a given region in the widthwise direction thereof and depressed inward in a radial direction of the tire along a circumference of the tread together with the carcass, belt, and at least one auxiliary layer, in which a section profile of the tread in the widthwise direction is divided into a central region extending between inflection points of the annular recess portion having an outwardly concave curvature in the radial direction of the tire, a pair of middle regions each ranging outward from one of the inflection points in the widthwise direction along an outwardly convex curvature in the radial direction to at least a position of a maximum diameter of the tire and a pair of side regions each ranging outward from the corresponding middle region in the widthwise direction toward a side end of the tread, and a stretching ratio of the cords in the at least one auxiliary reinforcing cord layer in the central region and side regions of the tread is equal to or more than that in the middle regions of the tread.

In a preferred embodiment of the invention, each middle region of the tread has a radius of curvature larger than those of the central region and the side regions.

PREFERRED EMBODIMENTS OF THE INVENTION

Figure 1:
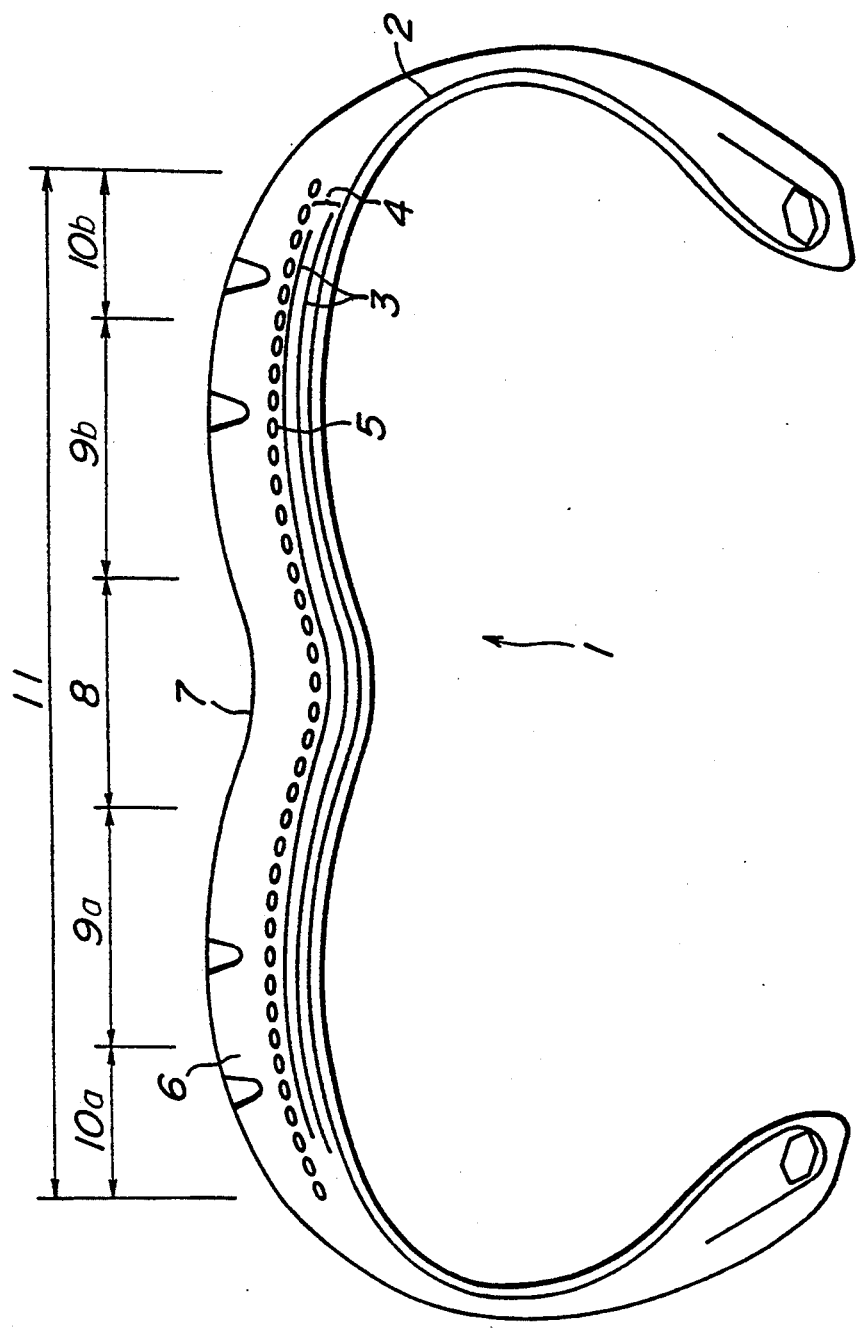
FIG. 1 is a diagrammatically sectional view in widthwise direction of an embodiment of the pneumatic radial tire according to the invention.

In FIG. 1 is sectionally shown an embodiment of the pneumatic radial tire according to the invention, in which numeral 1 is a tire, numeral 2 a carcass, numeral 3 rubberized cord layers, numeral 4 a belt, numeral 5 an auxiliary reinforcing cord layer, numeral 6 a tread, numeral 7 an annular recess portion, numeral 8 a central region, numerals 9a and 9b middle regions, numerals 10a and 10b side regions and numeral 11 a ground contact width of the tread.

The term "ground contact width of tread" used herein means a width of the tread contacting with ground under usually used internal pressure and load. Moreover, such internal pressure and load can be naturally settled in accordance with the standard of the tire to be used.

In the illustrated embodiment, the pneumatic radial tire 1 comprises the carcass 2 of one rubberized cord ply containing cords arranged at a cord angle of 90° with respect to the equatorial plane of the tire, the belt 4 superimposed on the carcass 2 and comprised of two rubberized cord layers 3, the cords of which layers being crossed with each other at a given cord angle with respect to the equatorial plane of the tire, one auxiliary reinforcing cord layer 5 substantially enveloping a crown portion of the carcass and the full radially outer surface of the belt 4 and containing heat-shrinkable cords arranged substantially in parallel to the equatorial plane of the tire, and the tread 6 reinforced with the belt 4 and the auxiliary reinforcing cord layer 5. The tread 6 has such a double crown structure that the central portion in the widthwise direction of the tread is concavely depressed inward in the radial direction of the tire together with the carcass 2, belt 4, and auxiliary layer 5 along the circumference of the tire to form an annular recess portion 7, in which the section profile of the tread 6 in the widthwise direction thereof is divided into the central region 8 extending between inflection points of the annular recess portion 7 having an outwardly concave curvature in the radial direction of the tire, the middle regions 9a and 9b each ranging outward from one of the inflection points in the widthwise direction along an outwardly convex curvature in the radial direction to at least a position of a maximum diameter of the tire and the side regions 10a and 10b each ranging outward from one of the middle regions 9a and 9b in the widthwise direction toward a side end of the tread. Moreover, the center region 8, middle regions 9a and 9b and side regions 10a and 10b somewhat change in accordance with the shape of the double crown structure. If the deepest point of the annular recess portion 7 is located at a center of the tread in the widthwise direction thereof, it is preferable that the width of the central region 8 between the inflection points is 20–35% of the ground contact width 11 and the axially outward ends of the middle regions 9a and 9b in the widthwise direction have a width of 70–85% of the ground contact width 11 and the axially outward ends of the side regions 10a and 10b have a width of 100–105% of the ground contact width 11. Moreover, the position of the deepest point of the annular recess portion may be somewhat shifted from the center of the tread toward either end of the tread in the widthwise direction thereof. That is, when the ground contact width of the tread is divided into three equal parts, the deepest point of the annular recess portion locates within a central part including the tread center among the above three equal parts.

According to the invention, the stretching ratio of the cords in the auxiliary reinforcing cord layer 5 in the central region 8 and the side regions 10a 10b of the tread 6 is equal to or more than that in the middle regions 9a and 9b.

The term "stretching ratio of the cords in the auxiliary reinforcing cord layer" used herein means a stretching percentage when the cords of the auxiliary reinforcing cord layer before the winding on the drum are stretched by winding under tension or by expanding in the radial direction in the vulcanization build-up. When the stretching ratio of the cords in the auxiliary reinforcing cord layer exceeds 5%, the cords are too stretched and hence the rubber penetrability of the cords is degraded to degrade the adhesion between cords and rubber. Further, the difference in the stretching ratio of the cords between the central region 8 and side regions 10a and 10b and the middle regions 9a and 9b is desirable to be not more than 2.5% from a viewpoint of production problems.

The number of the auxiliary reinforcing cord layers used is preferably 1 in view of tire weight and cost, but may be increased some in connection with high-speed durability, if necessary.

The stretching ratio of the cords in the auxiliary reinforcing cord layer is determined as follows. That is, in case of tires having an ordinary single crown structure, the belt, auxiliary reinforcing cord layer and tread rubber are successively applied onto a flat belt-tread (BT) drum to prepare a ring-shaped member, which is fitted onto an outer periphery of a green casing and expanded in the radial direction to form a green tire, and thereafter built up through vulcanization to form a tire product. In this case, the shaping quantity in the vulcanization is calculated to determine the stretching ratio. In the tire according to the invention, however, the tread 6 has the double crown structure as mentioned above, so that the tire product is formed in the same manner as described above except for the use of a drum having a wave form corresponding to the double crown structure, during which the shaping quantities of the regions 8, 9 and 10 in the vulcanization are calculated to determine the stretching ratio of the auxiliary reinforcing cord layer. Alternatively, when the belt, auxiliary reinforcing cord layer and tread rubber are applied onto the flat BT drum, tension applied to the cords in the auxiliary reinforcing cord layer is adjusted in the widthwise direction of the drum to determine the stretching ratio of the cords in the auxiliary reinforcing cord layer in the widthwise direction.

In the tread 6, it is preferable that the radius of curvature in the middle regions 9a and 9b is larger than those in the central region 8 and side regions 10a and 10b.

In the carcass 2, the cords are preferably arranged substantially perpendicular to the equatorial plane of the tire.

The belt 4 is formed by arranging at least two rubberized layers of low-elasticity cords so as to cross the cords of these layers at a relatively small cord angle, preferably 20°–30° with respect to the equatorial plane of the tire.

The pneumatic radial tire comprising the tread of double crown structure has hitherto been manufactured as follows. That is, an innerliner and a radial carcass of at least one rubberized cord ply are applied onto a drum, and the ends of these members are wound around a bead core set on the end portion thereof to produce a green casing. Separately, a belt, auxiliary reinforcing cord layer and tread rubber are applied onto a flat BT drum to form a belt-tread band, which is fitted onto the outer periphery of the above green casing and expanded in the radial direction to form a green tire, and then built-up through vulcanization in a mold having a shape corresponding to double crown structure of the tread. In this case, the belt-tread band is generally formed on the flat BT drum under conditions that the inner diameter of the band is substantially constant in the widthwise direction and also the tension applied is substantially constant in the widthwise direction. Therefore, when the belt-tread band is fitted onto the green casing and built-up through vulcanization in the mold so as to form the tread of double crown structure, the expanding degree of the auxiliary reinforcing cord layer in the radial direction differs in the widthwise direction of the auxiliary reinforcing cord layer. That is, the expanding degree of the auxiliary reinforcing cord layer becomes large at a position corresponding to the middle regions of the tread and small at positions corresponding to the central region and side regions of the tread, so that the stretching percentage of the cords in the auxiliary reinforcing cord layer becomes large in the middle regions and small in to the central region and side regions as compared with the state of winding on the BT drum. As a result, the central region and side regions of the tread, which are apt to expand in the radial direction through centrifugal force during high-speed running, are apt to be lacking in the necessary stretching ratio of the cords. In the tires manufactured by the above conventional method, however, a member reinforcing the belt should be arranged at a position corresponding to the central region and side regions of the tread in order to ensure high-speed durability.

According to the invention, the stretching ratio of the cords of the auxiliary reinforcing cord layer 5 enveloping substantially the crown portion of the carcass 2 and the full radially outer surface of the belt 4 is adjusted to an appropriate value in the widthwise direction of the belt. Concretely, the stretching ratio of the cords of the auxiliary reinforcing cord layer 5 in the central region 8 and side regions 10a and 10b of the tread is made equal to or more than that in the middle regions 9a and 9b by controlling the winding tension of a rubberized ribbon containing plural heat shrinkable cords such as nylon cords or the like when the ribbon is helically wound on the BT drum to form the auxiliary reinforcing cord layer, or by helically winding the ribbon under a constant tension or a controlled tension in the widthwise direction when using a drum having a shape similar to the tread shape of double crown structure. Thus, the expansion of the tread 6 at the central region 8 and side regions 10a and 10b in the radial direction of the tire is controlled when a large centrifugal force is applied to the tire during high-speed running. Alternatively, heat shrinkable rubberized bands each having a width corresponding to the width of each of the central region, middle regions and side regions of the tread may be wound on the BT drum with or without the control of tension. As a result, it is not required to newly arrange narrow-width members at the central region and side regions of the tread, so that the belt structure becomes simple. Furthermore, the radius of curvature of the middle regions 9a and 9b in the tread 6 is made larger than those of the central region 8 and side regions 10a and 10b, whereby interlaminar strain in the belt during ground contacting of the middle regions becomes small and durability can be improved.

The following examples are given in illustration of the invention and are not intended as limitations thereof.

Invention tires 1 and 2

The invention tire shown in FIG. 1 has a tire size of 225/50R16 and comprises a radial carcass 2 of one rubberized cord ply containing cords arranged at a cord angle of 90° with respect to the equatorial plane of the tire, a belt 4 superimposed on the carcass 2 and comprised of two rubberized cord layers 3, the cords of which layers 3 being crossed with each other at a cord angle of 26° with respect to the equatorial plane of the tire, an auxiliary reinforcing cord layer 5 enveloping substantially the crown portion of the carcass 2 and the full radially outer surface of the belt 4 and containing heat shrinkable cords arranged substantially in parallel to the equatorial plane of the tire, and a tread 6. The tread 6 has such a double crown structure that the central portion of the tread 6 in the widthwise direction thereof is concavely depressed (7) together with the carcass 2, belt 4, and auxiliary layer 5 inward in the radial direction of the tire along the circumference of the tread. Further, the section profile of the tread 6 in its widthwise direction is divided into a central region 8 between inflection points of the annular recess portion 7 having an outwardly concave curvature in the radial direction of the tire (corresponding to 33% of the ground contact width 11), middle regions 9a and 9b ranging outward from each of the inflection points to a width of 80% of the ground contact width 11 and side regions 10a 10b extending outward from the axially outer ends of the middle regions 9a and 9b toward a tread end in the widthwise direction. In the tire of the above structure, the stretching ratio of cords in the auxiliary reinforcing cord layer 5 in the above region; 8, 9a, 9b, 10a and 10b of the tread 6 is calculated as a stretching percentage of outer circumferential length after the vulcanization build-up when outer circumferential lengths of the auxiliary reinforcing cord layer in the above regions are standard in the formation of the belt-tread band by applying the belt, auxiliary reinforcing cord layer and tread rubber onto a BT drum. In the invention tire 1, a rubberized ribbon containing nylon cords therein is helically wound on a flat BT drum while controlling the winding tension of the cords in the widthwise direction of the auxiliary reinforcing cord layer to set the stretching percentage of the cords in all of the above regions at 4% after the vulcanization build-up. In the invention tire 2, the ribbon is helically wound on a BT drum having a shape similar to a tread shape of double crown structure under a condition that the winding tension of the ribbon in the central region and side regions of the tread is made larger than that in the middle regions, whereby the stretching percentage of the cords in the auxiliary reinforcing cord layer after the vulcanization build-up is 3.5% in the central region and side regions and 2.0% in the middle regions. Moreover, the radius of curvature in the tread 6 is 30 mm at the central region 8, 300 mm in the middle regions and 150 mm in the side regions.

Comparative tire

This tire is the same as in the invention tire 1 except that the auxiliary reinforcing cord layer is applied onto a flat BT drum under a uniform tension in the widthwise direction of the drum together with the belt and tread rubber and a pair of narrow-width members are arranged on both end portions of the auxiliary reinforcing cord layer. Moreover, each of the narrow-width members contains nylon cords arranged at a cord angle of 0° with respect to the equatorial plane of the tire.

Conventional tire

This tire is the same as in the invention tire 1 except that the auxiliary reinforcing cord layer is applied onto a flat BT drum under a uniform tension in the widthwise direction of the drum together with the belt and tread rubber.

Test method

The high-speed durability is evaluated by a high-speed drum durability test in which the test tire inflated to an internal pressure of 2.5 kgf/cm$^2$ is run on a drum of 3 m in diameter under a load of 450 kgf at a speed of 150 km/hr for 20 minutes and then the running speed is raised at a rate of 10 km/hr every 20 minutes until the occurrence of tire breakage. The results are shown in Table 1 together with tire weight and cost. Moreover, numerical values in Table 1 are represented by an index on the basis that the conventional tire is 100. As the index value becomes large, the better the high-speed durability, while as the index value becomes small, the lower the tire weight and cost.

As seen from the results of Table 1, the invention tires are excellent in high-speed durability as

TABLE 1

| | Conventional tire | Comparative Tire | Invention tire 1 | Invention tire 2 |
| --- | --- | --- | --- | --- |
| High-speed durability | 100 | 110 | 110 | 113 |
| Tire weight | 100 | 103 | 100 | 100 |
| Cost per tire | 100 | 103 | 100 | 100 | compared with the conventional tire though the tire weight and cost are the same as in the conventional tire. Furthermore, the invention tires are excellent in tire weight and cost as compared with the comparative tire though the high-speed durability is the same as in the comparative tire. Therefore, the invention tires are totally superior to the comparative and conventional tires.

As mentioned above, according to the invention, the stretching ratio of the cords of the at least one auxiliary reinforcing cord layer substantially enveloping the crown portion of the carcass and the full radially outer surface of the belt is adequately adjusted in the widthwise direction of the belt, or the stretching ratio of the cords at least one auxiliary reinforcing cord layer in the central region and side regions of the tread is made equal to or more than that in the middle regions of the tread, whereby the expansion of the tread at the central region and side regions in the radial direction of the tire is controlled when a large centrifugal force is generated in the tire during high-speed running and hence the occurrence of belt separation can be prevented and high-speed durability can be improved. Furthermore, it is not required to newly arrange a narrow-width member for reinforcing the belt in the central region and side regions of the tread, so that the belt structure becomes simple and the tire weight and cost are advantageously decreased. And also, when the radius of curvature at the middle regions of the tread is made larger than those at the central region and side regions of the tread, the interlinear strain of the belt can be suppressed at the ground contact area (i.e. middle regions) and hence the high-speed durability can be further improved. Moreover, the volume of the annular recess portion can sufficiently be ensured by controlling the expansion of the central region in the radial direction, whereby drainage of the tread can be attained even during high-speed running.

I claim:

1. A pneumatic radial tire comprising a carcass comprised of at least one rubberized cord ply, a belt superimposed on the carcass and comprised of rubberized cord layers, the cords of which layers being crossed with each other, at least one auxiliary reinforcing cord layer of rubberized heat shrinkable cords arranged substantially in parallel to an equatorial plane of the tire, the at least one auxiliary reinforcing cord layer substantially enveloping a crown portion of the carcass and a full radially outer surface of the belt, and a tread having an annular recess portion arranged in the tread at a given region in the widthwise direction thereof and depressed inward in a radial direction of the tire along a circumference of the tread together with the carcass, belt, and at least one auxiliary reinforcing cord layer, in which a section profile of the tread in the widthwise direction is divided into a central region extending between inflection points of the annular recess portion having an outwardly concave curvature in the radial direction of the tire, a pair of middle regions each ranging outward from one of the inflection points in the widthwise direction along an outwardly convex curvature in the radial direction to at least a position of a maximum diameter of the tire and a pair of side regions each ranging outward from the corresponding middle region in the widthwise direction toward a side end of the tread, and a stretching ratio of the cords in the at least one auxiliary reinforcing cord layer in the central region and side regions of the tread is equal to or more than that in the middle regions of the tread.

2. A pneumatic radial tire according to claim 1, wherein the width of the central region is 20–35% of a ground contact width of the tread, and the axially outward ends of the pair of middle regions in the widthwise direction have a width of 70–85% of the ground contact width, the axially outward ends of the pair of side regions in the widthwise direction have a width of 100–105% of the ground contact width, and a deepest point of the annular recess portion is located at a center of the tread in a widthwise direction thereof.

3. A pneumatic radial tire according to claim 1, wherein each middle region of the tread has a radius of curvature larger than those of the central region and side regions of the tread.

4. A pneumatic radial tire according to claim 1, wherein the tread is divided into three equal parts and a deepest point of the annular recess portion is located within a central part of the three equal parts, which central part includes a widthwise center of the tread.

5. A pneumatic radial tire according to claim 1, wherein the stretching ratio of the cords in the at least one auxiliary reinforcing cord layer is not more than 5% in the central, middle and side regions of the tread.

6. A pneumatic radial tire according to claim 5, wherein a difference in the stretching ratio of the cords in the at least one auxiliary reinforcing cord layer between the central region and side regions of the tread and the middle region of the tread is not more than 2.5%.

7. The pneumatic radial tire according to claim 1, wherein the belt is comprised of two rubberized cord layers and the cords of these layers are crossed with each other at a cord angle of 20°–30° with respect to the equatorial plane of the tire.

* * * * *